United States Patent [19]

Malyon

[11] Patent Number: 4,655,478
[45] Date of Patent: Apr. 7, 1987

[54] BOOK SUPPORT

[75] Inventor: Brian R. Malyon, Feltham, England

[73] Assignee: The British Library Board, London, England

[21] Appl. No.: 765,721

[22] Filed: Aug. 15, 1985

[30] Foreign Application Priority Data

Sep. 12, 1984 [GB] United Kingdom ................ 8422996

[51] Int. Cl.⁴ ............................................. B42D 3/00
[52] U.S. Cl. ....................................... 281/45; 281/49; 248/441.1
[58] Field of Search ..................... 248/448, 441.1, 451, 248/452, 453; 281/45, 49, 46, 47

[56] References Cited

U.S. PATENT DOCUMENTS

| | | | |
|---|---|---|---|
| 152,590 | 6/1874 | Behn, Jr. ................................ | 281/47 |
| 529,442 | 11/1894 | Gilman ................................. | 248/448 |
| 1,202,345 | 10/1916 | Wigginton ....................... | 248/448 X |
| 2,639,526 | 5/1953 | Bepristis ....................... | 248/441.1 X |
| 3,227,415 | 1/1966 | Fisher ............................... | 281/45 X |

FOREIGN PATENT DOCUMENTS 39343  8/1931  France ................................. 248/448

Primary Examiner—Ramon S. Britts
Assistant Examiner—Karen J. Chotkowski
Attorney, Agent, or Firm—Gifford, Groh, VanOphem, Sheridan, Sprinkle and Dolgorukov

[57] ABSTRACT

A book support has a pair of platens set in a V-shape and a felxible web spanning between the platens at the base of the V-shape. The platens may be mounted so that they can move towards and away from one another to accommodate books of different sizes and/or opened at different positions.

10 Claims, 2 Drawing Figures

BOOK SUPPORT

DESCRIPTION

1. Field of the invention.

This invention relates to a book support, for supporting a book in an open position. The invention is particularly useful for use in conjunction with photocopying apparatus for photocopying pages from a book. Examples of such photocopying apparatus are described in our copending Patent Applications copending U.S. Ser. Nos. 682,158, 682,170 and 857,129 and U.S. Pat. No. 4,585,334.

When photocopying books, particularly large bound books, it is necessary to support the book in a suitable way partly to prevent damage to the binding of the book and partly to correctly display the page to be photocopied to the photocopying machine.

SUMMARY OF THE INVENTION

According to the present invention, there is provided a book support comprising a pair of platens, the planes of which are set at an angle to one another to form a V-shape, and a flexible web spanning a gap between the platens at the vertex of the V-shape.

Preferably the platens can be moved apart and towards one another to alter the width of the gap at the vertex. The flexible web is preferably kept in tension so that it is stretched across the gap at the vertex whatever the width of the gap.

In use, the spine of a book which is being supported will sit in the gap between the platens and will itself be supported on the flexible web.

The platens may be mounted on tracks which extend parallel to their own planes and the platens may then be moved apart and towards one another by sliding along these tracks.

Industrial felt has been found to be a particularly suitable material for forming the flexible web. The felt (or other web material) may line the upper faces of the platens, and may be kept in tension across the gap between the platens by spring-loading.

In a preferred embodiment, a continuous length of flexible web passes from the upper edge of one of the platens across the surface of that platen, around the bottom edge of the platen, up the back surface of the platen and around a rod and then back down behind the platen and across the gap to a similar rod behind the other platen, around that rod down behind the other platen and up the front face of the other platen. Both rods are preferably connected by tension springs to points near to the tops of the respective platens.

The platens themselves preferably float, and it is only the presence of a book on the support which keeps the platen and the web in a position to which it has been set. When there is no book on the support, the platens will normally return to a rest position where they are close together, and this return movement is assisted by the springs which keep tension in the flexible web.

BRIEF DESCRIPTION OF THE DRAWINGS

The invention will now be further described, by way of example, with reference to the accompanying drawing, in which.

DESCRIPTION OF A PREFERRED EMBODIMENT

Figure 1:
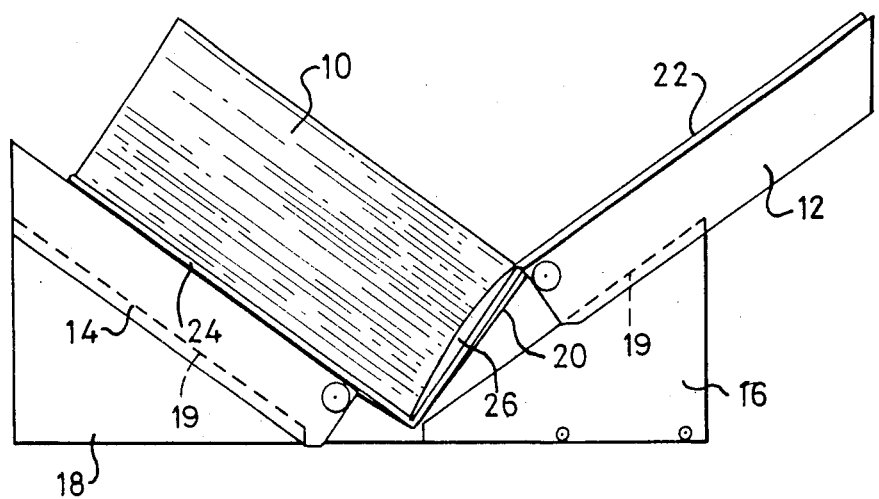
FIG. 1 is an end view of a book support in accordance with the invention.

FIG. 1 shows a book 10 opened and resting on a support. The support comprises a first platen 12 and a second platen 14. The platen 12 is supported on a ramp 16 and the platen 14 is supported on a corresponding ramp 18.

The platens 12 and 14 slide freely up and down the ramps 16 and 18 the top surfaces of 19 the ramps providing tracks for the platens. A flexible web 20 spans the gap between the lower ends of the platens 12 and 14. As shown in FIG. 1, the book 10 is open at its last page and one cover board 22 is resting on the platen 12 and the other cover board 24 and all the leaves of the book are resting on the platen 14. The spine 26 of the book is supported by the flexible web 20. Because the book 10 is opened at one end, the position of the platens 12 and 14 are not symmetrical. The platen 14 is at its extreme lower end position and the platen 12 is in a raised position. It will however be appreciated that, if the book was opened at its centre and laid in the support, then the positions of the platens 12 and 14 would normally be symmetrical about a centre line of the support.

Figure 2:
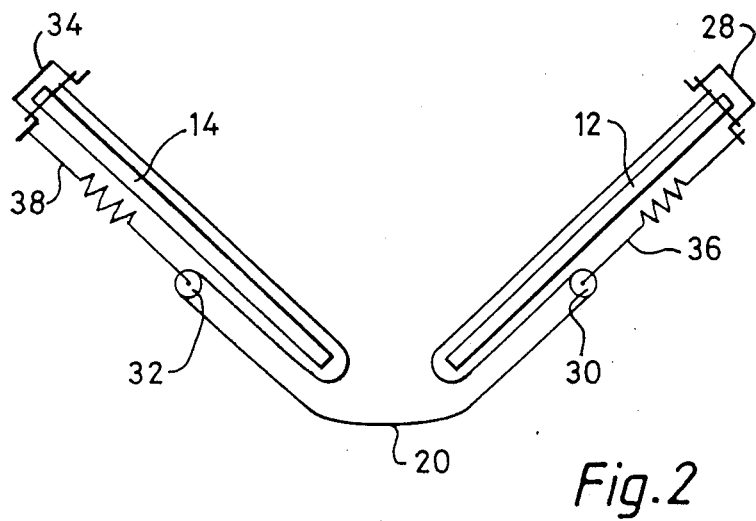
FIG. 2 is a diagrammatic view of the support of FIG. 1.

FIG. 2 shows how the flexible web 20 can be arranged. The web is continuous and has one end clamped at the top edge 28 of the platen 12. The web then extends over the upper face of the platen 12, around the bottom edge of the platen and up the underside of the platen to a rod 30. The web extends over the rod, back down behind the platen and across the gap between the platens and to another rod 32 in a corresponding position on the platen 14. The web then extends around the bottom edge of the platen 14 and up to a clamp 34 at the top edge. The rods 30 and 32 are supported by tension springs 36 and 38, and these springs thus serve to keep the web 20 in tension.

Before a book is laid in the support, the platens 12 and 14 can be moved manually to the approximate position which they will need to take up in use, depending on the size of the book to be put in the support. As the platens are moved apart the springs 36 and 38 will extend and will provide some biasing force tending to move the platens back into the rest position.

The presence of the web 20 across the gap between the platens forms an effective support for the book spine which keeps the book in the correct place on the platens and also prevents unnecessary damage to the spine. Whilst the book is in the support, the pages can be turned easily and, as desired, pages can be scanned by a scanning device or by a light source of a photocopying machine.

I claim:

1. A book support comprising:
    a pair of platens spaced apart to form a gap, each of said pair of platens being positioned on a plane, the respective planes of the pair of platens intersecting at a vertex to form a V-shape;
    a pair of surfaces forming tracks on which each of the pair of platens are slidably mounted, the tracks extending parallel to the respective plane of each of the pair of platens, whereby the pair of platens can be moved apart and towards one another, to alter the width of the gap at the vertex; and
    a flexible web spanning the gap at the vertex of the V-shape.

2. A book support as claimed in claim 1, wherein the flexible web is kept in tension so that it is stretched across the gap at the vertex whatever the width of the gap.

3. A book support as claimed in claim 1, wherein the web is of industrial felt.

4. A book support as claimed in claim 1, wherein the flexible web lines an upper face of each of the pair of platens, and is kept in tension across the gap between the pair of platens by spring-loading.

5. A book support as claimed in claim 1, wherein a continuous length of the flexible web passes from an upper edge of one platen of the pair of platens across a front surface of the one platen, around a bottom edge of the one platen, up a back surface of the one platen and around a rod and then back down behind the one platen and across the gap to a similar rod behind an other platen of the pair of platens and up a front face of the other platen.

6. A book support as claimed in claim 5 wherein both rods are connected by tension springs to points near to the upper edges of the respective platens.

7. A book support comprising:
a pair of spaced apart ramps, each of the spaced apart ramps having a top surface, aligned along a plane, the planes of the pair of top surfaces intersecting at a vertex to form a V-shape;
at least one track positioned on the top surface of each of the pair of spaced apart ramps, each of at least one track being parallel to the planes of the respective top surfaces;
a pair of platens spaced apart to define a gap, each of the pair of platens slidably mounted in the respective at least one track of each of the pair of spaced apart ramps, whereby the pair of platens can move apart and together to alter the width of the gap; and
a flexible web having a pair of ends, each of the pair of ends mounted to a respective one of the pair of platens.

8. The book support as claimed in claim 7, wherein each of the pairs of platens further comprise:
a bottom surface opposite the top surface and an upper edge and lower edge joining the bottom surface and top surface.

9. The book support as claimed in claim 7 further comprising:
a rod movingly mounted to each of the pair of platens; and
means for biasing the rod in a direction towards the upper edge of each of the pairs of platens.

10. The book support as claimed in claim 9 wherein the flexible web comprises:
a continuous length having one end affixed to the upper edge of one platen of the pair of platens, the continuous length extending across the top surface of the one platen, around the lower edge of the one platen, up the bottom surface of the one platen, around one rod of the pair of rods, back down behind the one platen, across the gap to an other rod of the pair of rods around the other rod, down behind the other platen of the pair of platens and up the top surface of the other of the pair of platens.

* * * * *